(12) United States Patent
Treitman et al.

(10) Patent No.: US 9,747,017 B2
(45) Date of Patent: Aug. 29, 2017

(54) SEGMENTED SCROLL BAR

(71) Applicant: ADOBE SYSTEMS INCORPORATED, San Jose, CA (US)

(72) Inventors: Richard S. Treitman, Lexington, MA (US); Robert Shaver, Watertown, MA (US); David S. B. Coletta, Arlington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/081,366

(22) Filed: Mar. 25, 2016

(65) Prior Publication Data

US 2016/0210036 A1 Jul. 21, 2016

Related U.S. Application Data

(63) Continuation of application No. 12/119,425, filed on May 12, 2008, now Pat. No. 9,329,744.

(51) Int. Cl.
*G06F 3/0483* (2013.01)
*G06F 3/0485* (2013.01)
*G06F 3/048* (2013.01)

(52) U.S. Cl.
CPC .......... *G06F 3/04855* (2013.01); *G06F 3/048* (2013.01); *G06F 3/0483* (2013.01); *G06F 3/0485* (2013.01)

(58) Field of Classification Search
CPC .... G06F 3/04855; G06F 3/048; G06F 3/0483; G06F 3/0485
See application file for complete search history.

(56) References Cited

U.S. PATENT DOCUMENTS

| | | |
|---|---|---|
| 4,714,992 A | 12/1987 | Gladney et al. |
| 4,949,300 A | 8/1990 | Christenson et al. |
| 5,008,853 A | 4/1991 | Bly et al. |
| 5,014,267 A | 5/1991 | Tompkins et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |

(Continued)

OTHER PUBLICATIONS

"Adobe to Acquire Virtual Ubiquity", The Buzzword Blog Building the first real word processor for the web, [Online] Retrieved from the internet: <URL:http://blog.buzzword.com/vu/index.php-?paged=2>, (Oct. 1, 2007), 10 pgs.

(Continued)

*Primary Examiner* — Anil Bhargava
(74) *Attorney, Agent, or Firm* — Shook, Hardy & Bacon, L.L.P.

(57) ABSTRACT

Apparatus, systems, and methods may operate to receive a first command to display a selected portion of an electronic document, wherein the selected portion is indicated by a visible indicator in a selected segment of a segmented scroll bar having a dynamically compressible trough. Further activities may include sending a second command to display a document page having a page number corresponding to the visible indicator, wherein the trough comprises segments corresponding to the pages of the document. Additional apparatus, systems, and methods are disclosed.

11 Claims, 6 Drawing Sheets

(56) References Cited

U.S. PATENT DOCUMENTS

| | | | |
|---|---|---|---|
| 5,293,619 A | 3/1994 | Dean | |
| 5,339,389 A | 8/1994 | Bates et al. | |
| 5,379,374 A | 1/1995 | Ishizaki et al. | |
| 5,388,196 A | 2/1995 | Pajak et al. | |
| 5,428,729 A | 6/1995 | Chang et al. | |
| 5,446,842 A | 8/1995 | Schaeffer et al. | |
| 5,471,318 A | 11/1995 | Ahuja et al. | |
| 5,510,808 A * | 4/1996 | Cina, Jr. | G06F 3/04855 345/684 |
| 5,515,491 A | 5/1996 | Bates et al. | |
| 5,608,872 A | 3/1997 | Schwartz et al. | |
| 5,617,539 A | 4/1997 | Ludwig et al. | |
| 5,664,183 A | 9/1997 | Cirulli et al. | |
| 5,671,428 A | 9/1997 | Muranaga et al. | |
| 5,732,184 A | 3/1998 | Chao et al. | |
| 5,758,079 A | 5/1998 | Ludwig et al. | |
| 5,778,368 A | 7/1998 | Hogan et al. | |
| 5,787,175 A | 7/1998 | Carter | |
| 5,835,601 A | 11/1998 | Shimbo et al. | |
| 5,867,654 A | 2/1999 | Ludwig et al. | |
| 5,907,324 A | 5/1999 | Larson et al. | |
| 5,920,694 A | 7/1999 | Carleton et al. | |
| 5,963,208 A | 10/1999 | Dolan et al. | |
| 5,966,512 A | 10/1999 | Bates et al. | |
| 5,978,817 A | 11/1999 | Giannandrea et al. | |
| 5,995,097 A | 11/1999 | Tokumine et al. | |
| 6,005,568 A | 12/1999 | Simonoff et al. | |
| 6,005,571 A | 12/1999 | Pachauri | |
| 6,088,702 A | 7/2000 | Plantz et al. | |
| 6,314,408 B1 | 11/2001 | Salas et al. | |
| 6,314,425 B1 | 11/2001 | Serbinis et al. | |
| 6,366,933 B1 | 4/2002 | Ball et al. | |
| 6,442,748 B1 | 8/2002 | Bowman-Amuah et al. | |
| 6,446,093 B2 | 9/2002 | Tabuchi | |
| 6,502,113 B1 | 12/2002 | Crawford et al. | |
| 6,507,845 B1 | 1/2003 | Cohen et al. | |
| 6,584,466 B1 | 6/2003 | Serbinis et al. | |
| 6,632,251 B1 | 10/2003 | Rutten et al. | |
| 6,643,663 B1 | 11/2003 | Dabney et al. | |
| 6,701,345 B1 | 3/2004 | Carley et al. | |
| 6,721,921 B1 | 4/2004 | Altman | |
| 6,757,871 B1 | 6/2004 | Sato et al. | |
| 6,772,393 B1 | 8/2004 | Estrada et al. | |
| 6,816,906 B1 | 11/2004 | Icken et al. | |
| 6,819,806 B1 | 11/2004 | Kubota et al. | |
| 6,839,878 B1 | 1/2005 | Icken et al. | |
| 6,865,548 B2 | 3/2005 | Wiechhers | |
| 6,865,713 B1 | 3/2005 | Bates et al. | |
| 6,874,124 B2 | 3/2005 | Murase et al. | |
| 6,889,896 B2 | 5/2005 | Silverbrook et al. | |
| 6,894,804 B2 | 5/2005 | Nguyen et al. | |
| 6,898,601 B2 | 5/2005 | Amado et al. | |
| 6,901,376 B1 | 5/2005 | Sculler et al. | |
| 6,918,082 B1 | 7/2005 | Gross et al. | |
| 6,934,721 B2 | 8/2005 | Schein | |
| 6,950,828 B2 | 9/2005 | Shaw et al. | |
| 6,991,154 B2 | 1/2006 | Silverbrook et al. | |
| 7,007,232 B1 | 2/2006 | Ross et al. | |
| 7,028,267 B1 | 4/2006 | Beezer et al. | |
| 7,044,363 B2 | 5/2006 | Silverbrook et al. | |
| 7,051,031 B2 | 5/2006 | Schein | |
| 7,146,367 B2 | 12/2006 | Shutt | |
| 7,249,314 B2 | 7/2007 | Walker et al. | |
| 7,263,655 B1 | 8/2007 | Carden, Jr. | |
| 7,325,186 B2 | 1/2008 | Jones et al. | |
| 7,574,669 B1 * | 8/2009 | Braun | G06F 3/0483 715/776 |
| 7,676,759 B2 * | 3/2010 | Carter | G06F 3/0485 715/721 |
| 7,724,249 B1 | 5/2010 | Horikawa et al. | |
| 7,769,810 B1 | 8/2010 | Kaufman | |
| 7,945,595 B1 | 5/2011 | Kraley | |
| 7,949,633 B1 | 5/2011 | Shaver et al. | |
| 2002/0163548 A1 | 11/2002 | Chiu et al. | |
| 2002/0186252 A1 * | 12/2002 | Himmel | G06F 3/04855 715/787 |
| 2004/0041843 A1 | 3/2004 | Cui et al. | |
| 2004/0088331 A1 | 5/2004 | Therrien et al. | |
| 2005/0064858 A1 | 3/2005 | Makela et al. | |
| 2005/0262225 A1 | 11/2005 | Halpern et al. | |
| 2006/0010382 A1 | 1/2006 | Ejiri et al. | |
| 2006/0026502 A1 | 2/2006 | Dutta | |
| 2006/0184901 A1 | 8/2006 | Dietz | |
| 2007/0198616 A1 | 8/2007 | Goto | |
| 2007/0239831 A1 | 10/2007 | Basu | |
| 2007/0260996 A1 | 11/2007 | Jakobson | |
| 2007/0271502 A1 | 11/2007 | Bedi et al. | |
| 2008/0059539 A1 | 3/2008 | Chin et al. | |
| 2008/0250329 A1 | 10/2008 | Stefik et al. | |

OTHER PUBLICATIONS

"Comparison of office suites", Comparison of office wuites—Wikipedia, the free encyclopedia [Online] Retrieved from the internet: <URL:http://en.wikipedia.org/wiki/List_of_office_suites> (Mar. 16, 2008), 4 pgs.

"Forthcoming Functionality", The Buzzword Blog Building the first real word processor for the web, [Online] Retrieved from the internet: <URL:http://blog.buzzword.com/vu/index.php?paged=3>, (Jul. 15, 2007), 10 pgs.

"Google Docs", Google Docs—Wikipedia, the free encyclopedia, [Online] Retrieved from the internet: <URL:http://en.wikipedia.org/wiki/Google_Docs>, (00/16/2008), 3 pages.

"List of word processors", From Wikipedia, the free encyclopedia the following is a list of word processors [Online] Retrieved from the internet: <URL:http://en.wikipdia.org/wiki/List_of_word_processors>, (Mar. 16, 2008), 4 pgs.

"The Buzzword Blog Building the first real word processor for the web", Buzzword vs Google docs [Online] Retrieved from the internet: <URL:http://blog.virtub.com/>, (Mar. 12, 2008), 13 pages.

"ThinkFree Docs :: Search, Share & Publish documents", [Online] Retrieved from the internet: <URL:http://thinkfreedocs.com/, (Mar. 16, 2008), 1 page.

"ThinkFree Docs :: Search, Share & Publish documents" [Online] Retrieved from the internet: <URL:http://www.thinkfreedocs.com/about/faq.html>, FAQ, (Mar. 16, 2008), 1 page.

ThinkFree Office by Haansoft Corporation, From Wikipedia, the free encyclopedia (Redirected from ThinkFree) [Online] Retrieved form the internet: <URL:http://en.wikipedia.org/wiki/ThinkFree>, (Nov. 7, 2006), 3 pgs.

"Working with Collaborators: Real time collaboration", [Online]. Retrieved from the internet: <URL:http://documents.google.com/support/bin/answer.py?answer=4097&topic=8628>, Google Docs Help Center, (Mar. 16, 2008), 2 pages.

"Working with Collaborators: Simultaneous editing and viewing", [Online] Retrieved from the internet: <URL:http://documents.google.com/support/bin/answer.py?answer=44680&topic=8628., Google Docs Help Center (Mar. 16, 2008), 2 pages.

"ZCubes", From Wikipedia, the free encyclopedia, [Online] Retrieved from the internet: <URL:http://en.wikipedia.org/wiki/ZCubes>, (Sep. 30, 2007), 5 pages.

"Zoho office Suite", From Wikipedia, the free encyclopedia (Redirected from Zoho Writer) Developed by AdventNet Inc., <URL:http://zoho.com>, [Online]. Retrieved from the internet: <URL:http://en.wikipedia.org/wiki/Zoho_Writer>, (Mar. 16, 2008), 5 pgs.

Descy, Don E. "Browser-Based Online Applications: Something for Everyone?" TechTrends: Linking Research and Practice to Improve Learning, 51(2), (Mar. 2007), 3-5.

Shen, H., "Integrating Advanced Collaborative Capabilities into Web-Based Word Processors", Lecture Notes in Computer Science, 4647, (2007), 1-8.

Simsarian, Kristian, et al., "Shared Spatial Desktop Development", Kungl Tekniska Hogkolan Royal Institute of Technology Numerical Analysis and Computing Science. CID-86, KTH, Stockholm, Swe- (56) References Cited

OTHER PUBLICATIONS den 1999. Report No. CID-86 ISSN No. ISSN 1403-073X Reports can be ordered from URL:http://www.nada.kth.se/cid/, (Aug. 1999), 103 pages.

* cited by examiner

SEGMENTED SCROLL BAR

CROSS-REFERENCE TO RELATED APPLICATION

This application is a continuation of U.S. patent application Ser. No. 12/119,425, filed on May 12, 2008, entitled "SEGMENTED SCROLL BAR", the entirety of which is incorporated herein by reference.

BACKGROUND

In many fields of endeavour, the content of electronic documents is viewed and reviewed. Such content includes text, drawings, audio recordings, video recordings, multimedia presentations, and the like. Large amounts of content are often viewed as part of a document divided into smaller portions, such as pages, where a scroll bar is used to navigate between the portions. Thus, to move from viewing the content on page one-hundred to viewing the content on page two-hundred, for example, the reviewer knows to move the scroll bar slider in one of two possible directions. However, other than this indication of direction, the reviewer often has no precise idea of where the slider should be placed in the trough to view the desired page. Thus, when reviewing documents with more than a few pages, the reviewer often resorts to locating the slider in the trough by trial and error, eventually encountering the proper location to select a particular page for review.

BRIEF DESCRIPTION OF DRAWINGS

Some embodiments are illustrated by way of example and not limitation in the figures of the accompanying drawings in which.

DETAILED DESCRIPTION

The inventors have determined that using a segmented scroll bar with a dynamically compressible trough can reduce or even eliminate trial and error as a mechanism for navigating to a specific page in a variety of documents.

For the purposes of this specification, the term "absolute location" within a document refers to a specific page number, paragraph number, column and/or line number, word number, or any other position of text within a document that can be directly referenced using a numeric or symbolic descriptor.

"Electronic content" includes any digital data that may be presented to a user (e.g., visually or audibly presented), such as an electronic document, page-descriptive electronic content including that contained in a page-descriptive electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as pieces of electronic text or other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

A "dynamically compressible trough" has individual segments that represent one or more portions of the displayed electronic content, such as content included in an electronic document. For example, the portions might correspond to pages or paragraphs in the document. The segment length is determined according to both the length of the content (e.g., in pages) and the height of the scroll bar relative to the height of visible indicators in the trough. As the number of represented content portions per segment increases, the visible indicators in the trough are displayed in an alternating (e.g., 1, 3, 5, 7, etc.) format, instead of a strictly sequential (e.g., 1, 2, 3, 4, etc.) format, so that the indicated segments represent the compression of an increasing number of the portions into each segment.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings, scroll bars, and other electronic content elements. An example of a rendering module includes a web browser component (e.g., Microsoft Internet Explorer) or some other component to render electronic content such as HTML pages. Another example of a rendering module includes the ADOBE.®. ACROBAT.®. electronic publishing program.

The term "rendering program" includes applications for rendering or presenting dynamic content to a user. An example of a rendering program is the ADOBE.®. FLASH.®. Player 9 runtime software application, as well as the Microsoft® Silverlight™. browser plug-in. In many embodiments, a rendering module interacts with a rendering program to render dynamic content. In some embodiments, a rendering module includes a rendering program.

A "segment" is a portion of the scroll bar trough that can be delimited using a segment division indicator, which comprises any kind of visible mark, including a horizontal line segment. In some embodiments, segments are delimited invisibly. This can occur, for example, when a displayed document has enough pages that the visible indicators are displayed in an alternating, and not strictly continuous, sequence.

"Visible indicators" comprise number, letters, or other symbols located in the trough. The visible indicators serve to indicate, relative to one another, the distance in the trough between portions of the displayed electronic content. For example, in many embodiments, the visible indicators also serve as page numbers of a displayed document. In this case, the visible indicators serve to indicate "absolute locations" within a document.

Figure 1:
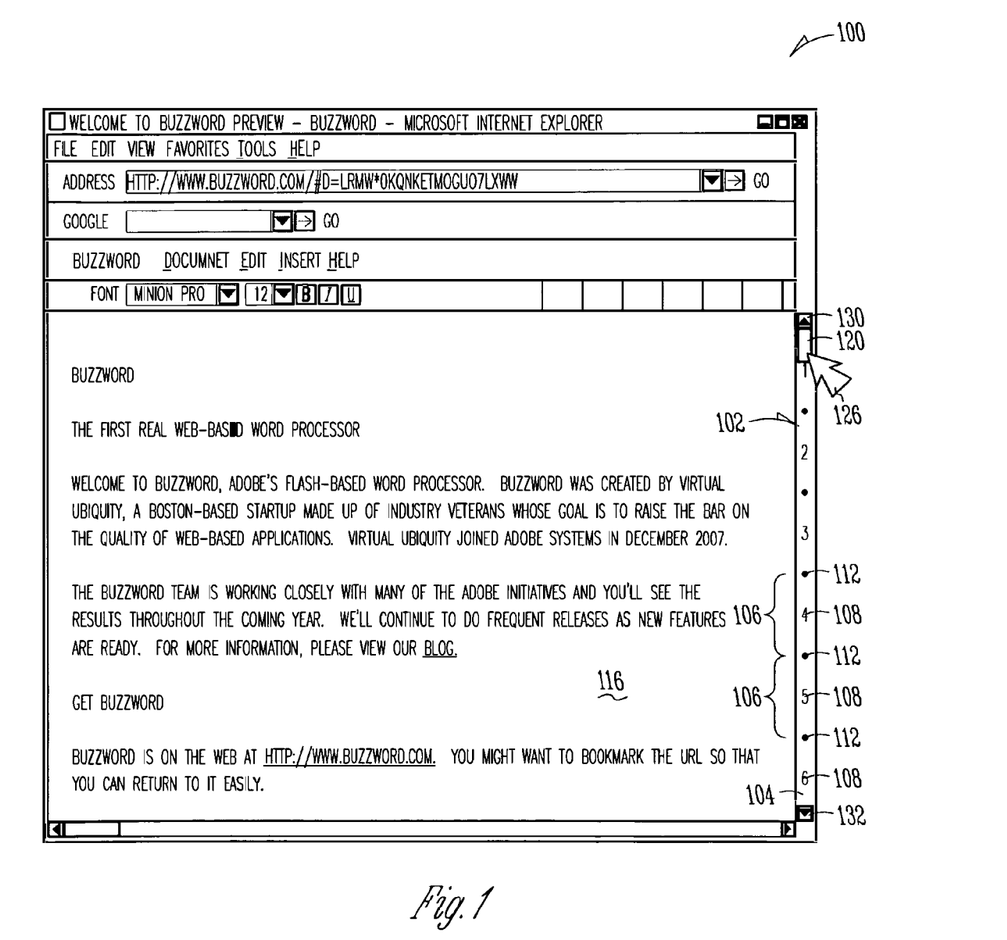
FIG. 1 illustrates a graphical user interface (GUI) that implements a segmented scroll bar, according to various embodiments.

FIG. 1 illustrates a GUI 100 that implements a segmented scroll bar 102, according to various embodiments. The GUI 100, which may comprise a client GUI, shows an example of a window that may be displayed by a rendering program to present renderings of electronic content 116 in the form of an electronic document that includes several pages of information.

It is common for one or more users (e.g., viewer, reviewers, editors, or other actors, such as automated processes) to view, review, and revise electronic content 116. In some embodiments, a review may be carried out by one person or by a team including multiple persons.

When viewing, reviewing, or revising, a user may start up an application (e.g., a rendering program forming part of a rendering module) to render or otherwise present the electronic content 116 to the user. This electronic content may take a variety of forms such as an electronic document, an audio file, video file, sequence of images, dynamic content, combinations thereof, and other forms of electronic content.

During the course of this activity, the user may be presented with a rendering of various content elements (e.g., using an output device, such as a display) included in or otherwise associated with the electronic content 116. In some embodiments, these content elements may be presented in a sequential order so as to indicate their positions or interrelationships within the electronic content, or for ease of user perception.

Various types of content elements contained within electronic content 116 may be presented to a user on an output device in various ways according to the nature of the content elements and/or the preferences of users. For example, electronic content 116 representing an electronic document may be presented on a display screen in the form of renderings of pages as they might appear if the electronic document were to be printed out. In some such embodiments, a user input device (e.g., a mouse, keyboard, touch screen, touch pad, voice input, etc.) is used to explore the electronic content 116. The rendering application may provide such affordances as scroll bars 102, fast forward/reverse scan buttons, or other GUI elements to be manipulated by the user to carry out document exploration, including viewing, reviewing, and editing functions.

The scroll bar 102 in most embodiments comprises a dynamically compressible trough 104 divided into a plurality of segments 106. The trough 104 includes visible indicators 108, and segment division indicators 112 (which may be visible as shown in FIG. 1, or invisible, as in FIG. 2). In some embodiments, when the segments 106 represent pages, or groups of pages, and the visible indicators 108 are implemented as page numbers, then the scroll bar 104 may be referred to as a "page-segmented scroll bar." In some embodiments, the segments 106 may represent alphabetic divisions of the content, and the visible indicators 108 may comprise letters of the alphabet.

The content 116 displayed via the GUI 100 can be navigated using a slider 120 in the trough 104. The slider 120 can be dragged up and down in the trough (assuming the trough 104 is displayed vertically, as shown in FIG. 1). In some embodiments, the trough 104 is displayed in a horizontal position, in which case the slider 120 moves side-to-side.

The location of the slider 120 in the trough 104 can be manipulated as a result of commands received from actuating a user input device, such as a mouse, to point to the slider 120 (e.g., with a GUI pointer 126). If the user opts to select the slider 120, such as by pointing to the slider 120, and then clicking and holding a button on a mouse, the slider 120 can be moved to a new location in the trough 104. The slider 120 can also be moved in the trough 104 by using a keyboard with up arrow/down arrow keys, or Page Up/Page Down keys, or by using a mouse or other user input device to select (e.g., "click") on the up/down arrows 130, 132 at each end of the trough 104. In addition, the user may go directly to a specific page by selecting (e.g., clicking) on or near one of the visible indicators that corresponds to that page.

The size of the slider 120 (e.g., its length in the trough 104) may correspond with the amount of content 116 that is displayed. For example, if the slide 120 covers visible indicators representing pages 1-3 of a document, then the GUI 100 may operate to render on a user display that is visible to the user at least a portion of pages 1-3 of the document. In many embodiments, the slider 120 is translucent, so that visible indicators 108 covered by the slider 120 are still visible.

Figure 2:
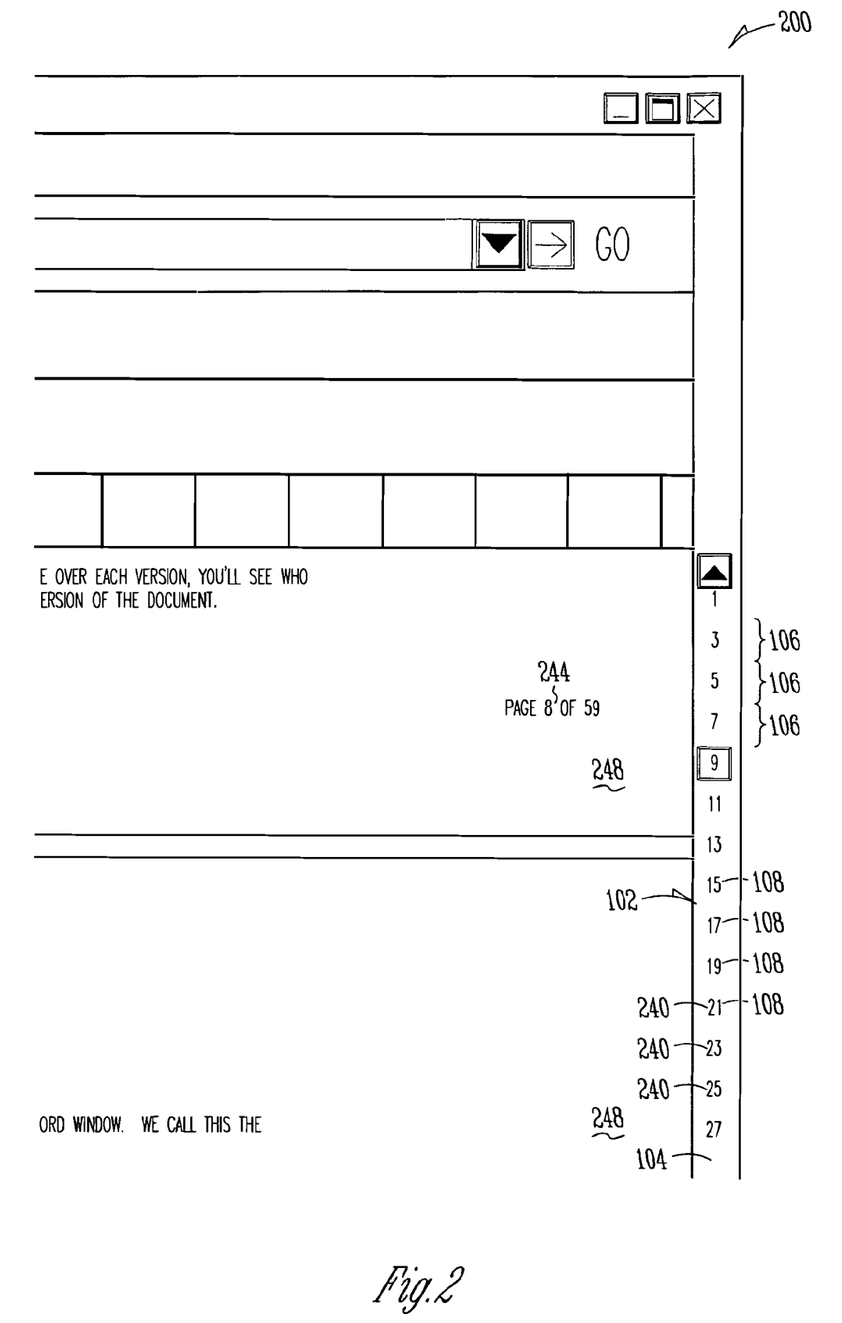
FIG. 2 illustrates a GUI with a segmented scroll bar and visible indicators presented as alternating sequence of page numbers, according to various embodiments.

FIG. 2 illustrates a GUI 200 with a segmented scroll bar 102 and visible indicators 108 presented as alternating (and not strictly continuous) sequence of page numbers, according to various embodiments. In this case, the number of pages 244 in the document 248 has become large enough that it is no longer practical to display a single visible indicator 108 each page. Thus, as the number of pages in a document increases, for example, the length of the scroll bar 102 that corresponds to each page (i.e., the length of a segment) decreases, and the number of pages represented by each segment 106 in the dynamically compressible trough 104 increases.

At a certain point, the segment division indicators become invisible (as in FIG. 2), and some of the visible indicators 108, such as those representing page numbers, are skipped. First, only every other visible indicator 108 appears, then every third visible indicator 108, and so on. When the segment division indicators become invisible, the dynamically compressible trough of the segmented scroll bar operates to include more than one portion (e.g., page, paragraph, etc.) of the content in each segment.

One example mechanism to determine how many portions, such as pages, should be indicated per segment includes the following activity:

(a) calculate the average number of pixels available per segment (Papps) by dividing the pixel height of the trough 104 by the number of portions (e.g., pages) of the content;

(b) calculate the minimum number of pixels needed per segment (Pmpps) by adding the height of the visible indicator to be displayed, in pixels, to the desired pixel height of the space above and below the indicator; and (c) calculate the amount of compression in the dynamically compressible trough by determining the number of portions (e.g., pages) per segment (PPS) as follows: if Papps≥Pmpps, then PPS=1; otherwise PPS=ceil(Pmpps/Papps), where "ceil" is equivalent to the JAVA programming language ceiling function, which operates to round up the argument given to the nearest integer. Those of ordinary skill in the art may also call this type of operation "ceiled" or "covered quotient" division.

Thus, if PPS=2, then the page numbers of a document could be displayed in the trough 104 as 1, 3, 5, 7, etc. If PPS=3, then the pages numbers of a document could be displayed in the trough 104 as 1, 4, 7, 10, etc. If PPS=3, then the pages numbers of a document could be displayed in the trough 104 as 1, 5, 9, 13, etc. And so on. Thus many embodiments may be realized.

Figure 3:
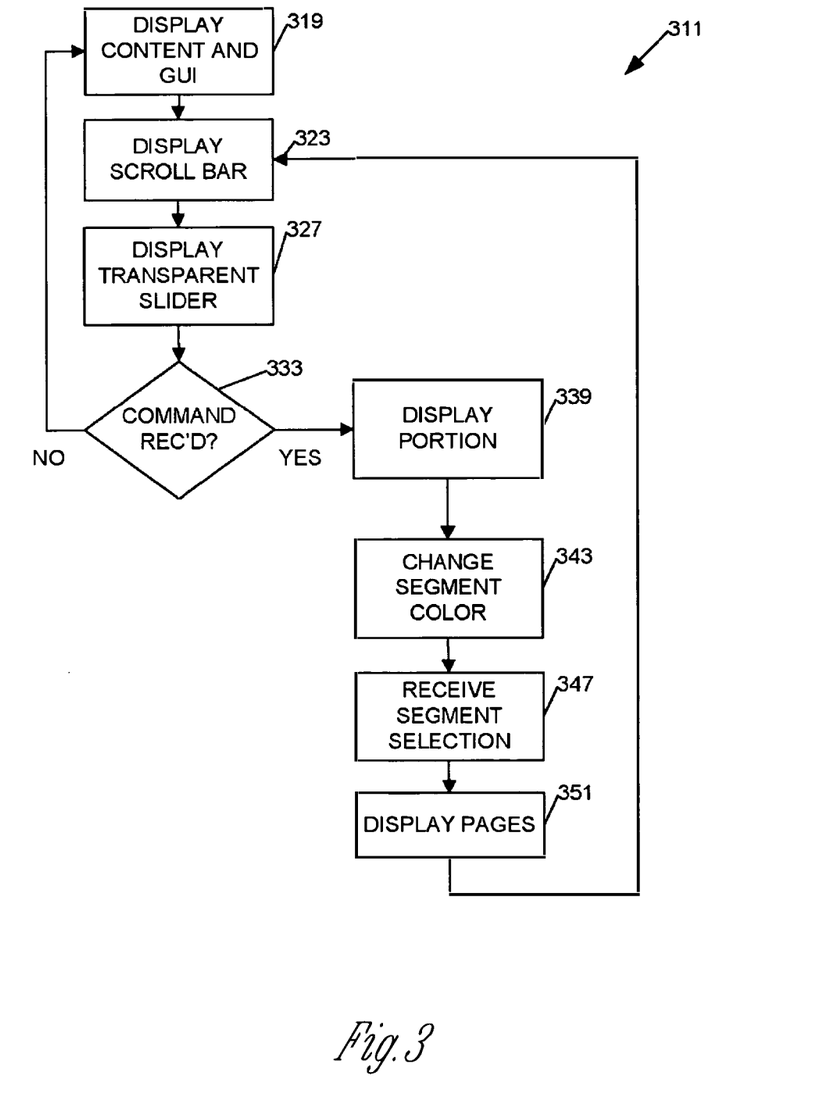
FIG. 3 is a flow diagram illustrating several methods according to various embodiments.

For example, FIG. 3 is a flow diagram illustrating several methods 311 according to various embodiments. The methods 311 are implemented in a machine-accessible and readable medium, and are operational over processes within and among networks. The networks may be wired, wireless, or a combination of wired and wireless. The methods 311 may be implemented as instructions, which when accessed by a machine, perform the processing depicted and described with respect to FIGS. 1-2.

Thus, in some embodiments, a method 311 of displaying a segmented scroll bar may begin at block 319 with displaying electronic content as part of a GUI. The electronic content may comprise a document, text, drawings, audio recordings, video recordings, multimedia presentations, etc. Any documents may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006. Another example is defined by the Microsoft® XML Paper Specification (XPS), Version 1.0, 2006.

The method 311 may continue at block 323 with displaying a scroll bar having a dynamically compressible trough as part of the GUI. The trough comprises segments corresponding to portions of the electronic content, and some or all of the segments may include visible indicators of absolute locations of the corresponding the portions within the electronic content.

In some embodiments, the method 311 may include displaying a translucent slider in the trough at block 327, wherein the visible indicators remain visible even when the translucent slider is displayed on top of the visible indicators.

If no command is received to move the slider in the trough at block 333, then the method 311 may including returning to block 319. However, if it is determined at block 333 that the method 311 includes receiving a command to move the slider in the trough to a selected one of the segments, then the method 311 may include, at block 339, displaying a selected one of the portions (e.g., part or all of a page) of the electronic content corresponding to the selected segment. As noted previously, the visible indicators may comprise numeric indicators (e.g., representing page numbers or other numbered items), non-numeric indicators, alphabetic indicators, and symbolic indicators (e.g., combinations of numeric and non-numeric indicators to operate as paragraph indicators, chapter indicators, figure or drawing indicators, index location indicators, etc.).

In some embodiments, the method 311 includes, at block 343, changing the color of one or more of the segments selected by a first activity with respect to the segments (e.g., using a mouse to hover the screen pointer over a segment) to indicate the next portion of the electronic content to be displayed if the segment is selected by a second activity (e.g., a mouse click to actually select the segment). Thus, the method 311 may include receiving a segment selection at block 347. Changing the color of a segment might include changing the hue of a segment, as well as simply displaying the segment as opaque, or as a different shade of gray, such as when a more basic black-on-white display environment is used.

The method 311 may go on to include, at block 351, displaying the number of pages corresponding to the number of the segments covered by a slider in the trough, as noted previously. In some embodiments, the total number of document pages may be displayed as the last of the visible indicators in the trough (e.g., page number "59" would be the last number displayed in the trough 104 of FIG. 2). Many other embodiments may be realized.

Figure 4:
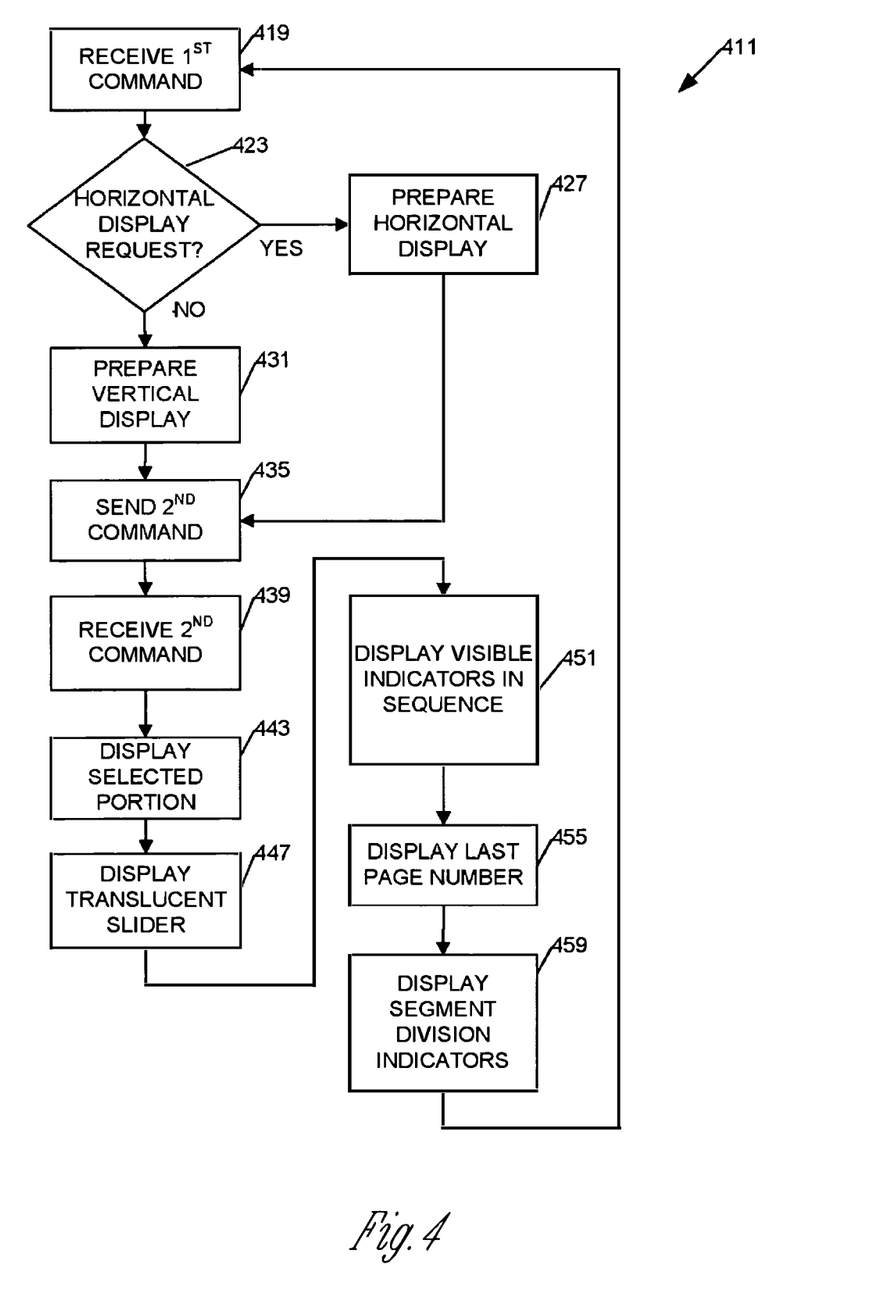
FIG. 4 is a flow diagram illustrating several additional methods according to various embodiments.

For example, FIG. 4 is a flow diagram 411 illustrating several additional methods according to various embodiments. The methods 411 are implemented in a machine-accessible and readable medium, and are operational over processes within and among networks. The networks may be wired, wireless, or a combination of wired and wireless. The methods 411 may be implemented as instructions, which when accessed by a machine, perform the processing depicted and described with respect to FIGS. 1-2.

In some embodiments, a method 411 of displaying a segmented scroll bar may begin at block 419 with receiving a first command, perhaps at a server device, to display at least part of a selected one of several portions of an electronic document (e.g., if the portions equate to document pages, then at least part of a page will be displayed). The selected portion can be indicated by a visible indicator in a selected segment of a dynamically compressible trough in a segmented scroll bar.

In many embodiments, a vertically-oriented display will be used. That is, as shown in FIG. 1, for example, the movement of pages is from the top of the GUI toward the bottom of the GUI, or vice-versa. In some embodiments, a horizontally-oriented display will be used, which more closely imitates the appearance of a newspaper, magazine, or hardbound book. In this case, a horizontally-oriented trough may be used, perhaps located near the bottom of the GUI. A slider in the horizontal trough will move from the viewer's left-hand side toward the right-hand side, and vice-versa, causing the display of pages to appear as if the pages of a book were being turned in front of the viewer.

Thus, if it is determined that there has been a request for a horizontally-oriented display at block 423, then the method 411 may include preparing for display, at block 427, and eventually displaying the trough in a substantially horizontal position proximate to the lower side of the portion of content selected for display. Actual display may occur subsequently to the activity of block 435, which may include the action of sending a second command (e.g., from a server device to a client device) to display the selected portion as part of a document page having a page number corresponding to the visible indicator in the selected segment.

Here, as noted previously, the trough comprises segments corresponding to the portions of the document. It should be noted that the display commands described herein can be sent and received within a server, within a client, or between a server and a client. If there is no request for a horizontal display, as determined at block 423, the method 411 may include preparing for display, at block 431, and eventually displaying the trough in a substantially vertical position proximate to the right-hand side of the selected portion of the document as part of the GUI. Prior to display, the method 411 may go on to include receiving the second command at block 439, perhaps at a client device.

In most embodiments, the method 411 includes displaying the selected portion of the document on a display, perhaps forming a part of a client device, at block 443. The segmented scroll bar is also displayed, and in some embodiments, one or more of the segments have a variable length that corresponds to the length of the portion(s) represented. Thus, the segment length may correspond to page length, for example.

As noted previously, the method 411 may include displaying the number of pages corresponding to the segments covered by the slider in the trough, so that the slider covers approximately the same number of pages that are displayed. The method 411 may go on to include displaying a translucent slider in the trough at block 447, wherein the visible indicators remain visible even when the translucent slider is displayed on top of the visible indicators.

In some embodiments, the method 411 includes, at block 451, displaying a plurality of visible indicators in sequence, such as a monotonically increasing or monotonically decreasing sequence of integers which are visible as numeric indicators in the trough. The sequence of integers may include displayed integers and non-displayed integers, wherein the non-displayed integers comprise at least N integers between each of the displayed integers, and wherein N is an integer greater than or equal to one. This latter use of non-displayed integers may occur when the dynamically compressible trough includes several document portions per segment, such that some of the visible indicators in a sequence are skipped (e.g., every odd integer is displayed, up until the last page of the document).

The method 411 may go on to block 455 to include displaying a number of visible indicators, wherein at least one of the number corresponds to the last page number of the electronic content. Thus, the last number displayed in the trough is the same as the last page of the displayed document. The method 411 may include displaying several segment division indicators comprising line segments spanning at least part of a width of the trough and located in the trough between the segments (e.g., see FIG. 1). Of course, other symbols or characters can be used in place of line segments, such as asterisks, periods, etc.

Those of ordinary skill in the art will realize that each of the method elements shown in FIG. 4 may be added to or substituted for any of the method elements shown in FIG. 3. Additionally, those of ordinary skill in the art will also realize that each of the method elements of FIGS. 3-4 may be combined with the other elements shown in a variety of ways, to form a variety of methods that use some or all of the elements from each of these figures in serial, parallel, looped, and/or repetitious fashion.

Figure 5:
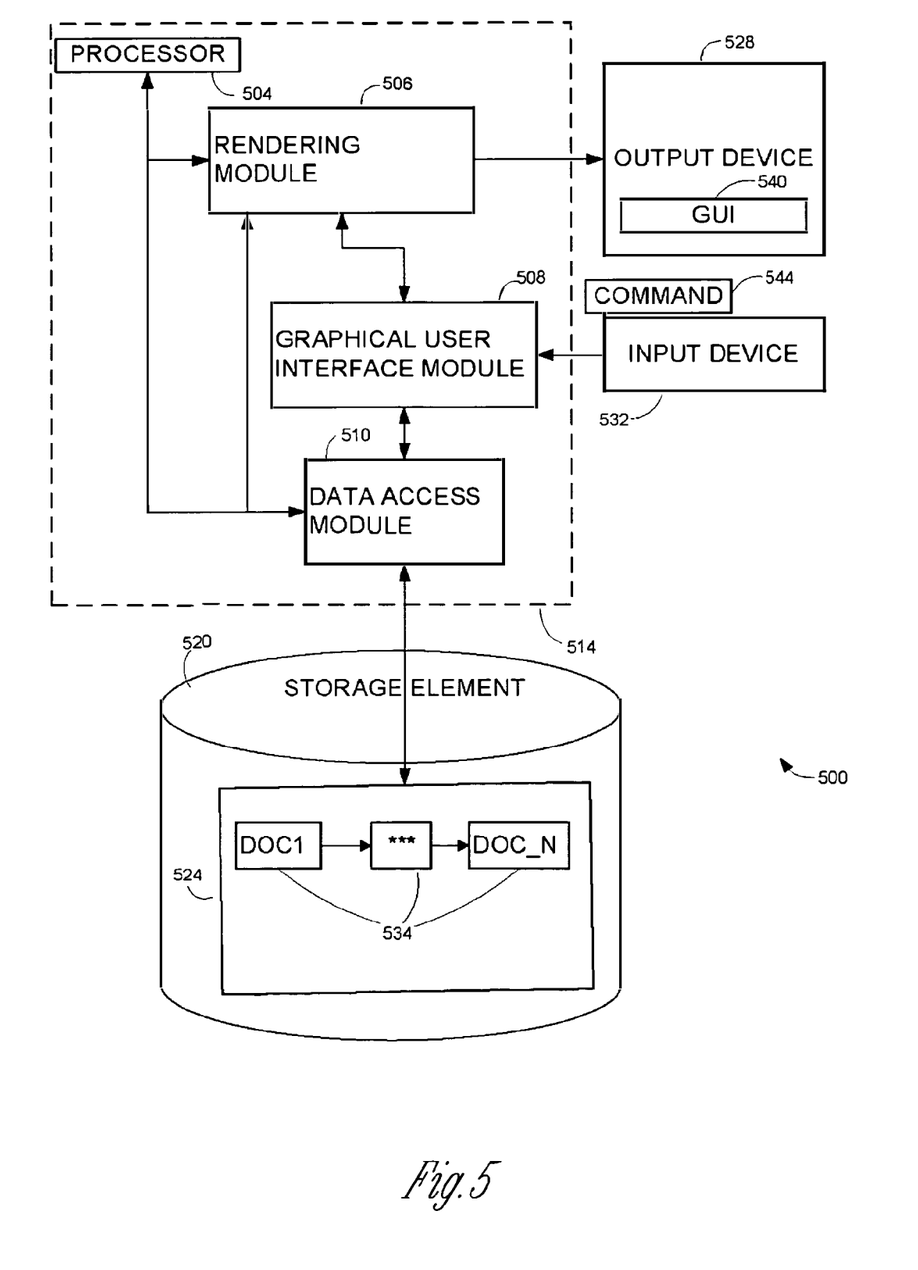
FIG. 5 is a block diagram of apparatus and systems according to various embodiments.

FIG. 5 is a block diagram of a system 500 according to various embodiments. The system 500 may include a number of modules such as one or more processors 504, a rendering module 506, a GUI module 508 and a data access module 510. The rendering module 506 and the GUI module 508 may take the form of an integral module, or exist as separate modules, as shown. These modules may be associated within a machine 514, such as a personal digital assistant (PDA), laptop, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 to access a storage element 520, such as a database, a memory, a disk, or other storage device. The storage element 520 may serve to contain one or more items having electronic content 524, such as electronic documents 534. The data access module 510 may operate to read from and/or write to the electronic content 524 and may provide reading and writing services for the benefit of other system modules, including the GUI module 508, the rendering module 506, and the processor 504.

The data access module 510 may be present in some embodiments, and absent in others. When present, the data access module 510 may operate as a mediator between the various components of the system 500 and the electronic content 524. For example, the storage element 520 may be included in a remote server.

The rendering module 506 may be operably coupled to an output device 528, such as a display screen, printer, or loudspeaker, among others. This output device 528 may be used for presenting renderings of documents 534. Rendering may take the form of displaying the documents 534, including a vertically or horizontally-oriented version of the dynamically compressible trough in the segmented scroll bar described above.

The GUI module 508 may be operably connected to the rendering module 506 and the data access module 510. The rendering module 506 may comprise a portable document format processing program in some embodiments.

The GUI module 508 may receive input from a variety of input devices 532 (e.g., a keyboard, a mouse, a trackball, voice recognizer, touch pad, touch screen, etc.). Thus, many embodiments may be realized.

For example, a system 500 to display a segmented scroll bar with a dynamically compressible trough may include an output device 528, comprising a display, as well as a rendering module 506 to display electronic content 524 on the display as part of a GUI 540, which may be similar to or identical to either of the GUIs 100, 200 of FIGS. 1, 2, respectively. The system 500 may also include a storage element 520 to store instructions, which when executed, cause the rendering module 506 to display a scroll bar having a dynamically compressible trough as part of the GUI 540, in accordance with the processes shown and described with respect to FIGS. 1-4. In most embodiments, the system 500 includes one or more user input devices 528 to send commands 544 to manipulate a translucent slider in the trough, wherein visible indicators in the trough remain visible even when the translucent slider is displayed on top of the visible indicators.

Figure 6:
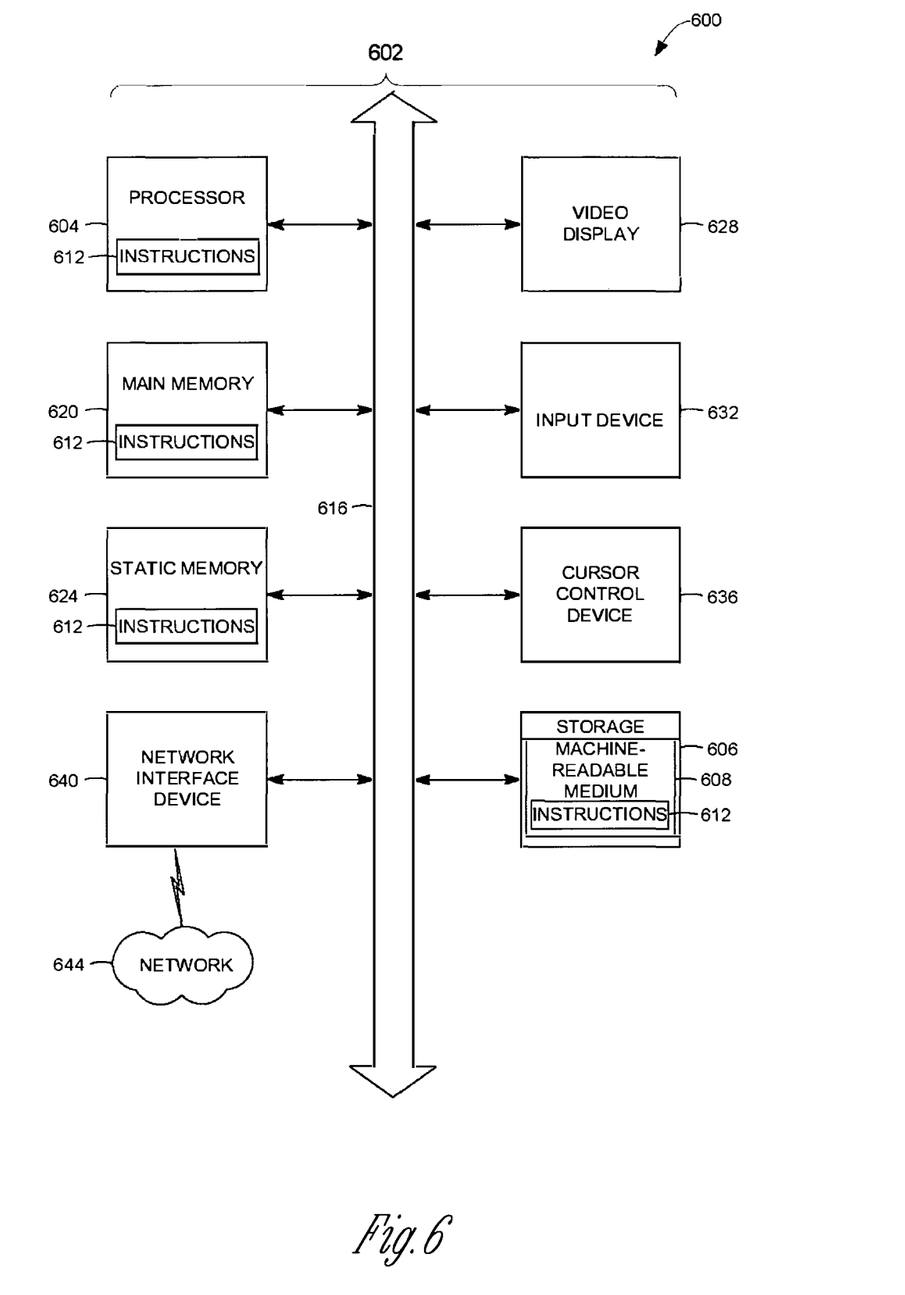
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

The machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., HTTP). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In some embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the registers of the processor 604, memories 620, 624, and the storage device 606 that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may thus provide the ability to more quickly and accurately locate a specific portion of electronic content. Improved productivity and satisfaction on the part of the user may result.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multiprocessor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
causing to display a first electronic content with a graphical user interface;
causing to display a first scroll bar on the graphical user interface, the first scroll bar including first two consecutive quantitative indicators on first two consecutive segments, the first two consecutive quantitative indicators indicating respective two adjacent locations within the first electronic content;
causing to display a second electronic content with the graphical user interface; and
causing to display a second scroll bar on the graphical user interface, the second scroll bar including second two non-consecutive quantitative indicators on second two consecutive segments, the second two non-consecutive quantitative indicators indicating respective two non-adjacent locations within the second electronic content.

2. The method of claim 1, further comprising:
determining the first two consecutive quantitative indicators on the first two consecutive segments based at least in part on a length of the first electronic content; and
determining the second two non-consecutive quantitative indicators on the second two consecutive segments based at least in part on a length of the second electronic content.

3. The method of claim 2, wherein the second two non-consecutive quantitative indicators are determined in response to determining the length of the second electronic content greater than the length of the first electronic content.

4. The method of claim 1, further comprising:
determining respective lengths of the second two consecutive segments based at least in part on a length of the second electronic content and a height of the scroll bar relative to a height of one of the second two non-consecutive quantitative indicators.

5. One or more non-transitory computer-readable media storing one or more sequences of instructions that, when executed by at least one processor, cause an apparatus to:
select a first mode, based at least in part on a length of a first electronic content, to display a graphical user interface with the first electronic content;
display a first scroll bar on the graphical user interface in the first mode, the first scroll bar including first two indicators on first two consecutive segments, the first two indicators indicating respective first two locations within the first electronic content, the first two indicators having a first quantitative difference;
select a second mode, based at least in part on a length of a second electronic content, to display the graphical user interface with the second electronic content; and
display a second scroll bar on the graphical user interface in the second mode, the second scroll bar including second two indicators on second two consecutive segments, the second two indicators indicating respective second two locations within the second electronic content, the second two indicators having a second quantitative difference that is different from the first quantitative difference.

6. The computer-readable media of claim 5, further comprising instructions that, when executed by the at least one processor, cause the apparatus to:
determine the first two consecutive quantitative indicators on the first two consecutive segments based at least in part on a length of the first electronic content; and
determine the second two non-consecutive quantitative indicators on the second two consecutive segments based at least in part on a length of the second electronic content.

7. The computer-readable media of claim 5, wherein the second two indicators are two numerical numbers, and the second quantitative difference is calculated based on a difference between the two numerical numbers.

8. The computer-readable media of claim 5, wherein the second two indicators are two letters, and the second quantitative difference is calculated based on a number of letters between the two letters.

9. The computer-readable media of claim 5, further comprising instructions that, when executed by the at least one processor, cause the apparatus to:
display a slider over one of the first two indicators; and
display a portion of the first electronic content at a location within the first electronic content, the location corresponding to the one of the first two indicators.

10. The computer-readable media of claim 9, further comprising instructions that, when executed by the at least one processor, cause the apparatus to:
receive a command to move the slider to another one of the first two indicators; and display a portion of the first electronic content at another location within the first electronic content, the another location corresponding to the another one of the first two indicators.

11. The computer-readable media of claim 9, further comprising instructions that, when executed by the at least one processor, cause the apparatus to:
display a plurality of pages of the first electronic content between the first two locations in response to the slider moved over between the first two indicators.

* * * * *